US012661915B2

(12) United States Patent
Mizuno et al.

(10) Patent No.: US 12,661,915 B2
(45) Date of Patent: Jun. 23, 2026

(54) DETECTION SYSTEM AND INKJET RECORDING APPARATUS

(71) Applicant: KYOCERA Document Solutions Inc., Osaka (JP)

(72) Inventors: Masahiko Mizuno, Osaka (JP); Shunsuke Yamasaki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 151 days.

(21) Appl. No.: 18/884,817

(22) Filed: Sep. 13, 2024

(65) Prior Publication Data

US 2025/0100307 A1 Mar. 27, 2025

(30) Foreign Application Priority Data

Sep. 21, 2023 (JP) ................................ 2023-156273

(51) Int. Cl.
*B41J 25/308* (2006.01)
*B41J 2/175* (2006.01)

(52) U.S. Cl.
CPC ......... *B41J 25/3082* (2013.01); *B41J 2/1752* (2013.01)

(58) Field of Classification Search
CPC ............................ B41J 25/3082; B41J 2/1752
See application file for complete search history.

(56) References Cited

U.S. PATENT DOCUMENTS

2015/0217574 A1 8/2015 Moriguchi

FOREIGN PATENT DOCUMENTS

JP 2014125286 A * 7/2014
JP 2015-142994 A 8/2015

OTHER PUBLICATIONS

Naruse Kentaro, "Sheet-Residual-Quantity Detection Device and Image Formation Apparatus" (JP 2014125286 A), Jul. 7, 2014, [Description of Embodiments] (Year: 2014).*
Reference AA (US 2015/0217574 A1) above, is substantiaiiy equivalent to Reference AB (JP 2015-142994 A).

* cited by examiner

*Primary Examiner* — Lisa Solomon
(74) *Attorney, Agent, or Firm* — Stein IP, LLC

(57) ABSTRACT

A detection system includes a detection target device and a detection device. The detection target device includes a first rotating member rotatable about a first axis, and repeats an operation corresponding to a rotation angle of the first rotating member every time the first rotating member makes a 1/N rotation, N being an integer of 2 or greater. The detection device includes a second rotating member rotatable about a second axis due to a driving force transmitted from the first rotating member, and an output value of the detection device repeats monotonic increase or monotonic decrease in accordance with a rotation angle of the second rotating member every time the second rotating member makes 1 rotation. Every time the first rotating member makes a 1/N rotation, the second rotating member makes 1 rotation.

5 Claims, 13 Drawing Sheets

DETECTION SYSTEM AND INKJET RECORDING APPARATUS

INCORPORATION BY REFERENCE

This application is based on and claims the benefit of priority from Japanese Patent Application No. 2023-156273 filed on Sep. 21, 2023, the contents of which are hereby incorporated by reference.

BACKGROUND

The present disclosure relates to a detection system and an inkjet recording apparatus.

To obtain a satisfactory image quality with an inkjet recording apparatus, an appropriate gap is necessary between a conveyed sheet and an inkjet head.

SUMMARY

According to one aspect of the present disclosure, a detection system includes a detection target device and a detection device. The detection target device includes a first rotating member rotatable about a first axis, and repeats an operation corresponding to a rotation angle of the first rotating member every time the first rotating member makes a 1/N rotation, N being an integer of 2 or greater. The detection device includes a second rotating member rotatable about a second axis due to a driving force transmitted from the first rotating member. An output value of the detection device repeats monotonic increase or monotonic decrease in accordance with a rotation angle of the second rotating member every time the second rotating member makes 1 rotation. Every time the first rotating member makes a 1/N rotation, the second rotating member makes 1 rotation.

This and other features of the present disclosure and specific benefits obtained according to the present disclosure will become further apparent from the description of embodiments which follows.

DETAILED DESCRIPTION

Hereinafter, a description will be given of an embodiment of the present disclosure, which will be preceded by a description of problems encountered in conventional technologies.

For an appropriate gap between a conveyed sheet and an inkjet head, techniques for adjusting the gap in accordance with sheet thicknesses have conventionally been studied. For example, there are conventional inkjet recording apparatuses where the height of an inkjet head changes depending on the presence/absence, or the thickness, of a sheet. In such conventional inkjet recording apparatuses, for example, a photo interrupter is used as a sensor, and light is interrupted when no sheet exists under a carriage.

Now, conceivable as means for adjusting the gap is a configuration in which an inkjet head is supported via a stepped member capable of handling various sheet thicknesses, and the height of the inkjet head is changed by sliding the stepped member. In this case, where an operation amount of the stepped member is checked to guarantee that the gap is appropriate, in order to handle sheets of various thicknesses, it is necessary to improve the accuracy of detecting the operation amount.

In view of the above background, an object of the present disclosure is to detect the operation amount of a detection target device with high accuracy.

Hereinafter, with reference to the accompanying drawings, a description will be given of a detection system 200 and an inkjet recording apparatus 1 according to an embodiment of the present disclosure.

Figure 1:
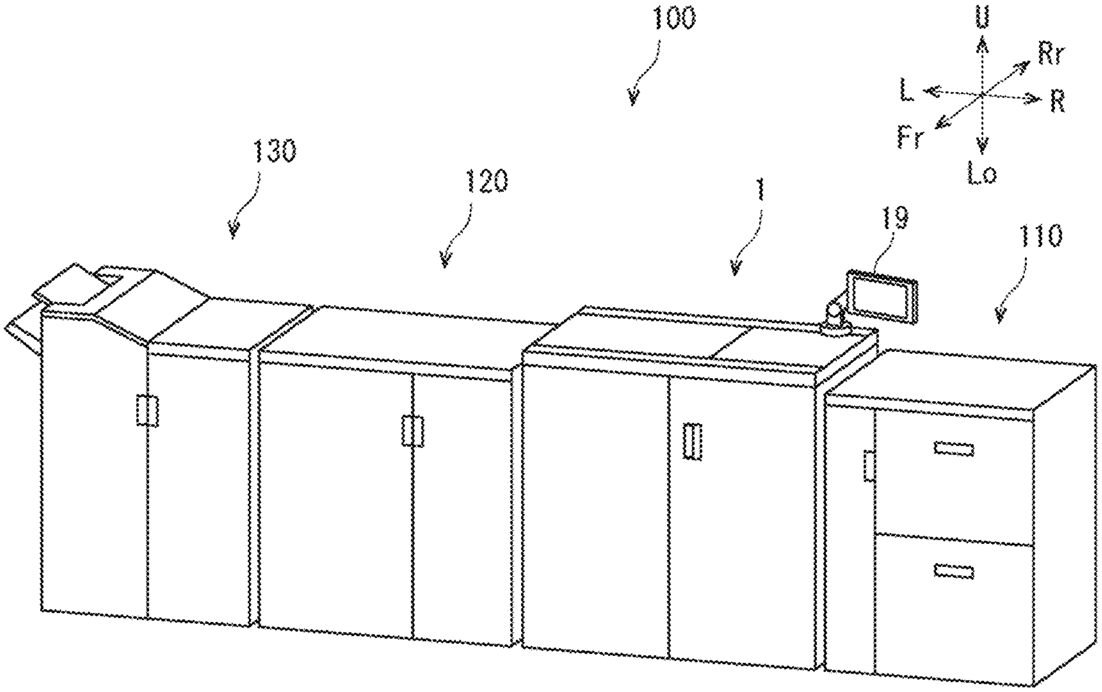
FIG. 1 is a perspective view illustrating an external appearance of an image forming system according to an embodiment of the present disclosure.
Figure 2:
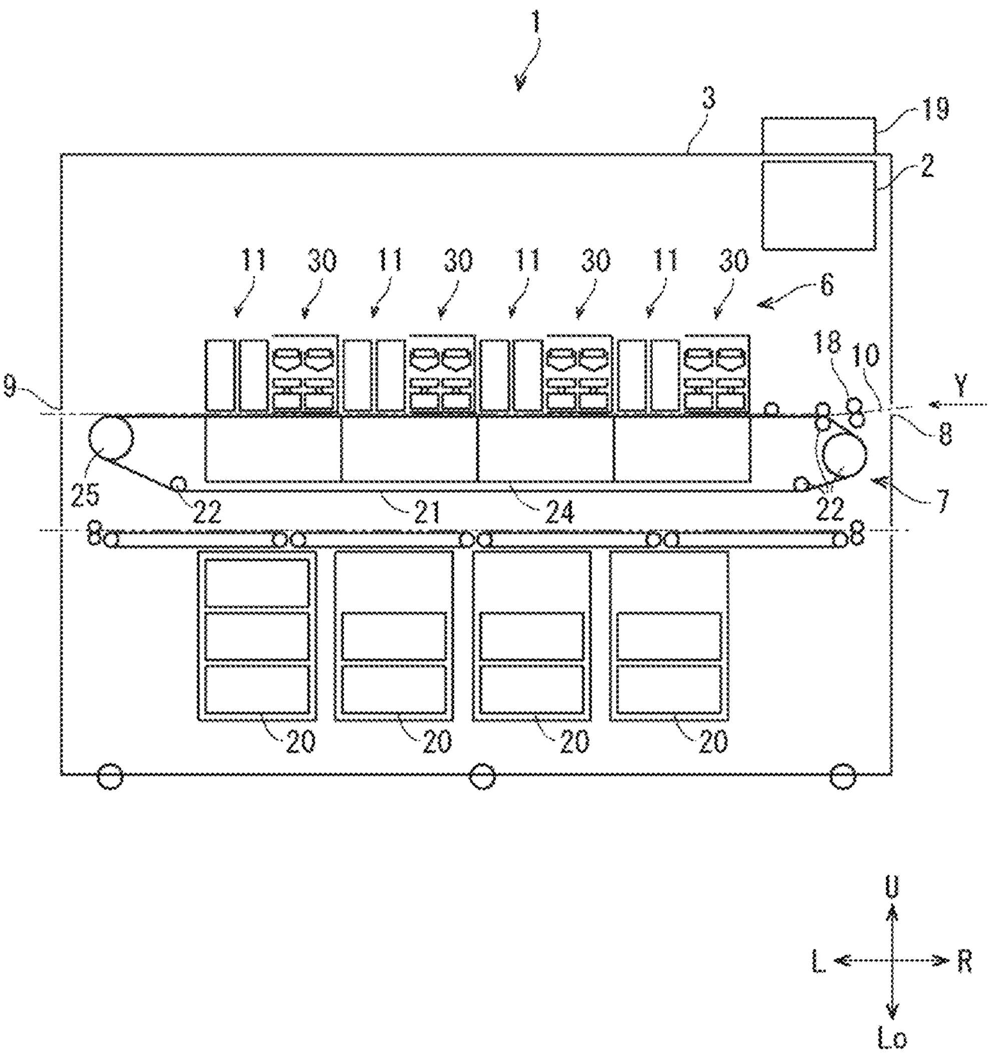
FIG. 2 is a front view schematically illustrating an internal configuration of an inkjet recording apparatus according to the embodiment of the present disclosure.
Figure 3:
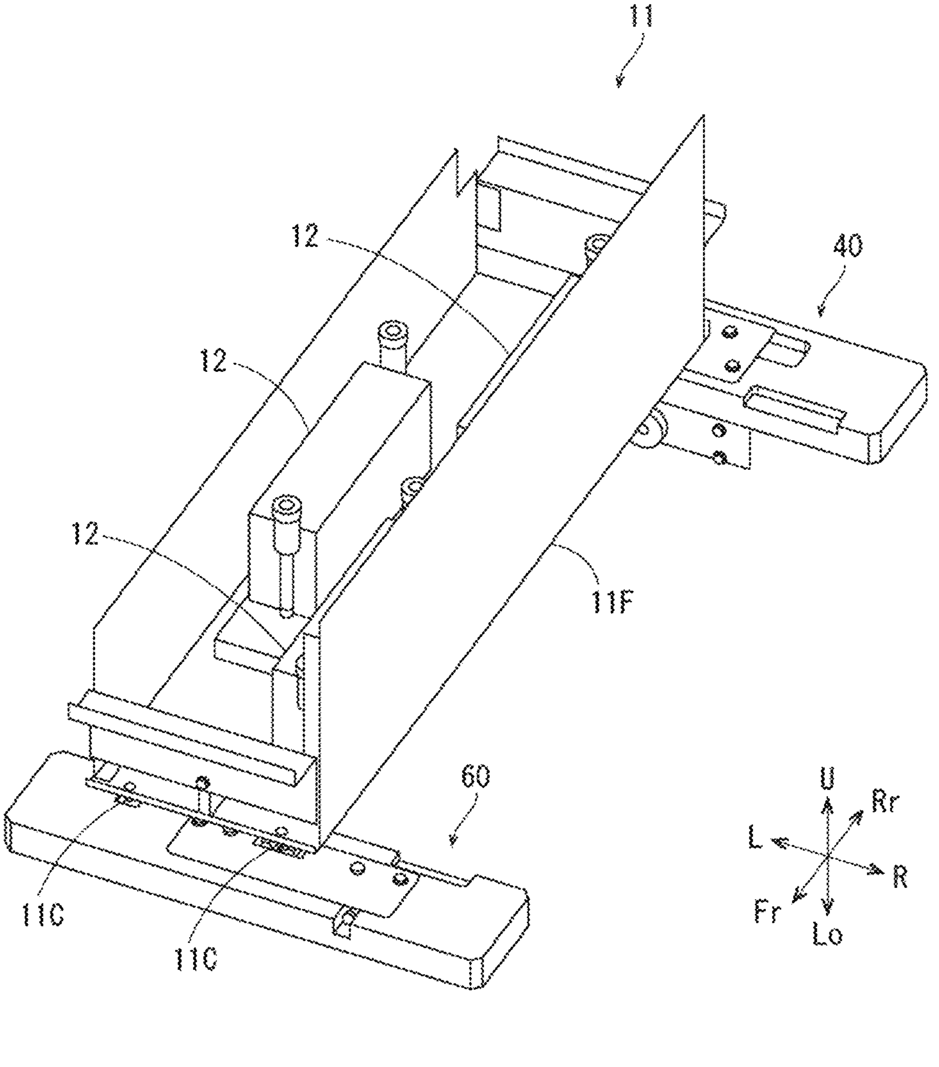
FIG. 3 is a perspective view illustrating a head unit according to the embodiment of the present disclosure.
Figure 4:
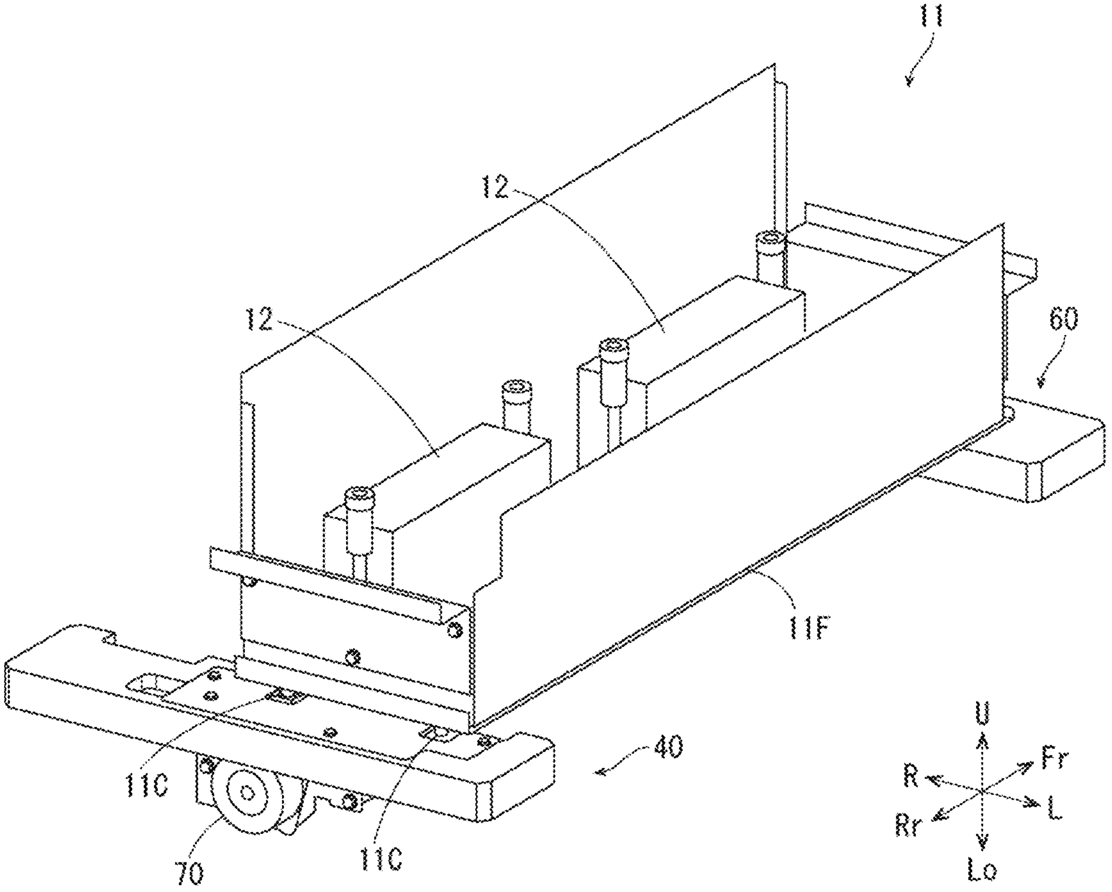
FIG. 4 is a perspective view illustrating the head unit according to the embodiment of the present disclosure.

FIG. 1 is a diagram illustrating an external appearance of an image forming system 100. FIG. 2 is a front view schematically illustrating an internal configuration of the inkjet recording apparatus 1. FIGS. 3 and 4 are each a perspective view illustrating a head unit 11. In the following description, the near side of the sheet on which FIG. 2 is drawn is defined as a front side (front) of the inkjet recording apparatus 1, and right and left directions are defined based on the perspective of viewing the inkjet recording apparatus 1 from in front thereof. In each of the figures, U, Lo, L, R, Fr, Rr respectively represent upper, lower, left, right, front, and rear.

The image forming system 100 (see FIG. 1) includes a sheet feeding apparatus 110, the inkjet recording apparatus 1, a drying apparatus 120, and a post-processing apparatus 130. The sheet feeding apparatus 110 accommodates several thousand sheets, and feeds the sheets to the inkjet recording apparatus 1. The inkjet recording apparatus 1 forms an image on a sheet by an inkjet method. The drying apparatus 120 applies heat to ink having been ejected onto the sheet to dry the ink. The post-processing apparatus 130 applies post processing to the sheet, including punching, stapling, folding, etc.

The inkjet recording apparatus 1 (see FIG. 2) includes a main body housing 3 that is in a rectangular parallelepiped shape. At a central part inside the main body housing 3, there is disposed a conveyance unit 7 that conveys a sheet in a Y direction by attracting the sheet by suction. Above the conveyance unit 7, there is disposed an image forming unit 6 that ejects ink to form an image. In a right side surface of the main body housing 3, there is disposed a sheet feeding port 8 through which a sheet is introduced from the sheet feeding apparatus 100. In a left side surface of the main body housing 3, there is disposed a discharge port 9 through which a sheet with an image formed thereon is discharged into the drying apparatus 120. Inside the main body housing 3, there is disposed a conveyance path 10 that extends from the sheet feeding port 8, through a gap between the conveyance unit 7 and the image forming unit 6, to the discharge port 9. Upstream of the conveyance unit 7 in the conveyance direction Y, a registration roller 18 is disposed.

The conveyance unit 7 includes a conveyance belt 21, which is an endless belt, and a suction portion 24. The conveyance belt 21 has a large number of air holes (unillustrated), and is wound around a driving roller 25 and a driven roller 22. An upper surface of the suction portion 24 has a large number of air holes (unillustrated), and is in contact with an inner surface of the conveyance belt 21. The suction portion 24 sucks air through the air holes of the conveyance belt 21 and the air holes of the suction portion 24, and thereby, a sheet is attracted by suction to the conveyance belt 21. The driving roller 25 is driven, by a driving portion (unillustrated) including a motor and a reduction gear, to rotate in a counterclockwise direction, as a result of which the conveyance belt 21 rotates in the counterclockwise direction and conveys the sheet attracted thereto by suction.

The image forming unit 6 includes a plurality of (in the present embodiment, four) head units 11. The head units 11 (see FIGS. 3 and 4) each include one or more inkjet heads 12 (in the present embodiment, three inkjet heads 12 arranged in a staggered pattern). To the head unit 11 for black ink, an ink container 20 filled with the black ink is connected. To the head unit 11 for cyan ink, an ink container 20 filled with the cyan ink is connected. To the head unit 11 for magenta ink, an ink container 20 filled with the magenta ink is connected. To the head unit 11 for yellow ink, an ink container 20 filled with the yellow ink is connected. To the right of each of the head units 11, there is disposed a maintenance device 30 that performs maintenance of the inkjet head 12.

A control portion 2 (see FIG. 2) includes a computing portion (unillustrated) and a storage portion (unillustrated). The computing portion is, for example, a CPU (Central Processing Unit). The storage portion includes storage media such as a ROM (Read Only Memory), a RAM (Random Access Memory), an EEPROM (Electrically Erasable Programmable Read Only Memory), etc. The computing portion reads and executes a control program stored in the storage portion to thereby perform various kinds of processing. Note that the control portion 2 may be achieved with an integrated circuit that does not use software.

On top of the main body housing 3, there is disposed a display operation portion 19 (see FIGS. 1 and 2). The display operation portion 19 includes a display panel (unillustrated), a touch panel (unillustrated) which is laminated to the display panel, and a key pad (unillustrated). The control portion 2 displays screens showing information of an operation menu, a status, and the like regarding the inkjet recording apparatus 1 on the display panel, and controls various portions of the inkjet recording apparatus 1 based on operations detected on the touch panel and the key pad.

What follows is a description of the basic image forming operation of the inkjet recording apparatus 1. When an image forming job is input to the inkjet recording apparatus 1 via the display operation portion 19, an external computer, or the like, the sheet feeding apparatus 100 sends out a sheet through the sheet feeding port 8 into the conveyance path 10, and the registration roller 18, of which rotation has been stopped, corrects skew of the sheet. When the registration roller 18 sends out the sheet into the conveyance unit 7 at a predetermined timing, the conveyance unit 7 causes the sheet to be attracted onto the conveyance belt 21 by suction, and conveys the sheet in the Y direction. Onto the sheet, ink is ejected through nozzles, and thereby, an image is formed on the sheet. The sheet having an image formed thereon is discharged through the discharge port 9 into the drying apparatus 120.

[Adjustment Device]

Each of the head units 11 has a rear end part and a front end part respectively supported by an adjustment device 40 and an adjustment device 60. The adjustment devices 40 and 60 each have a function of adjusting positions of the head units 11 in an upper-lower direction.

Figure 5:
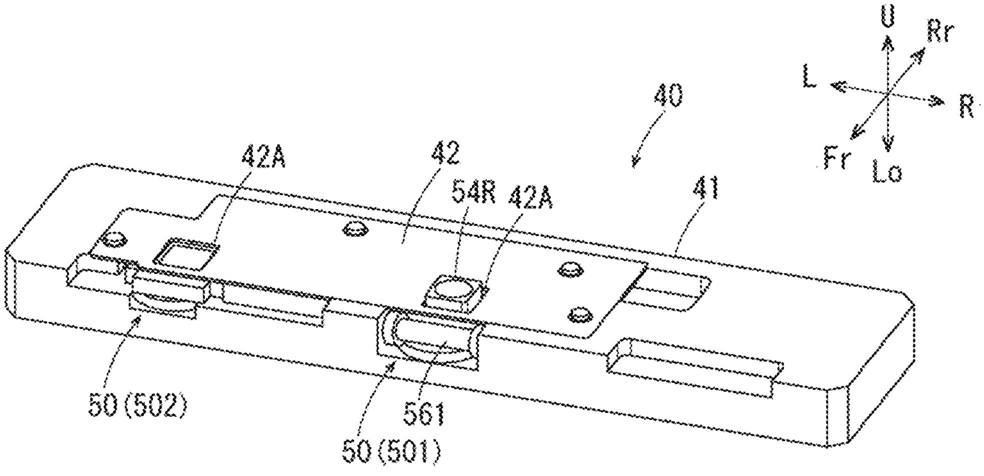
FIG. 5 is a perspective view illustrating an adjustment device according to the embodiment of the present disclosure.
Figure 6:
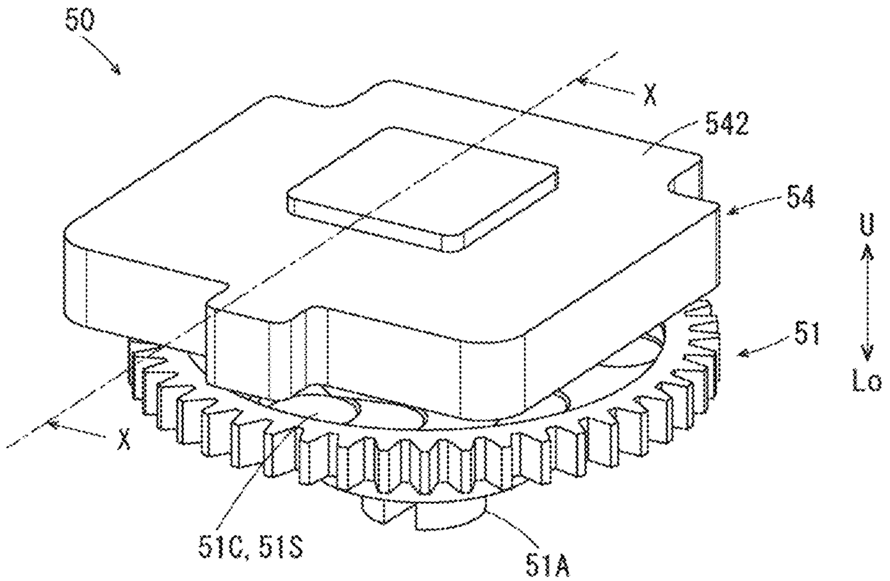
FIG. 6 is a perspective view illustrating a gap adjustment device according to the embodiment of the present disclosure.
Figure 7:
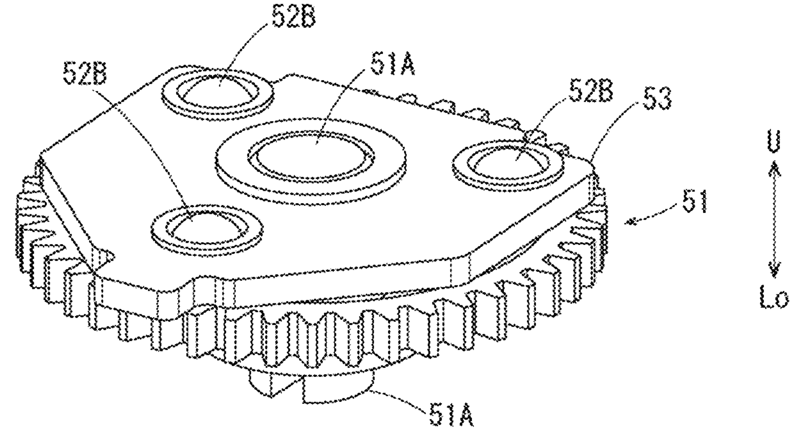
FIG. 7 is a perspective view illustrating a rotating member, spherical bodies, and a holder according to the embodiment of the present disclosure.
Figure 8:
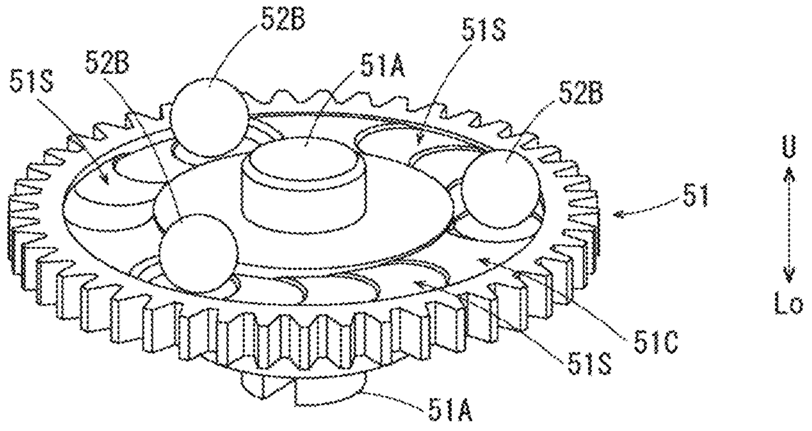
FIG. 8 is a perspective view illustrating the rotating member and the spherical bodies according to the embodiment of the present disclosure.
Figure 9:
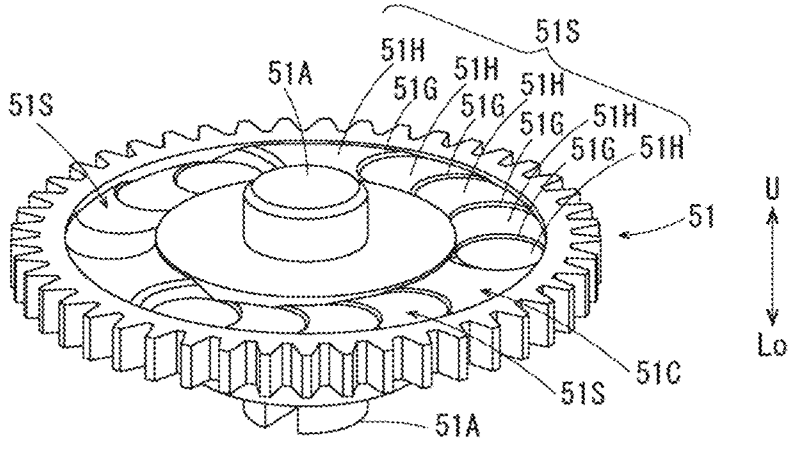
FIG. 9 is a perspective view illustrating the rotating member according to the embodiment of the present disclosure.
Figure 10:
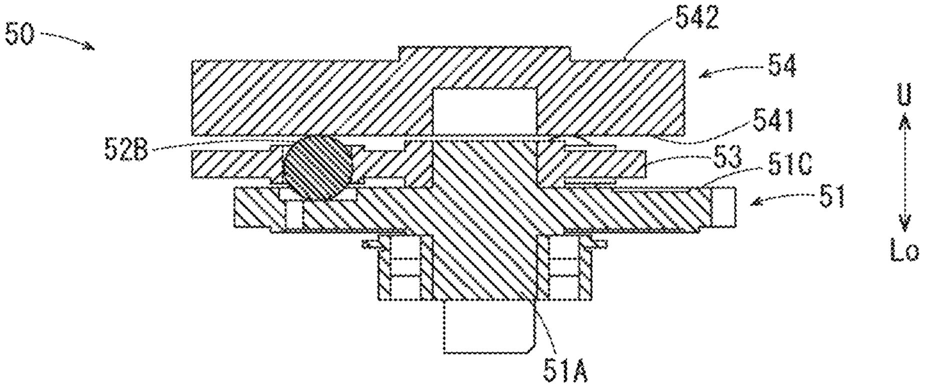
FIG. 10 is a sectional view illustrating a cross section taken along line X-X in FIG. 6.
Figure 11:
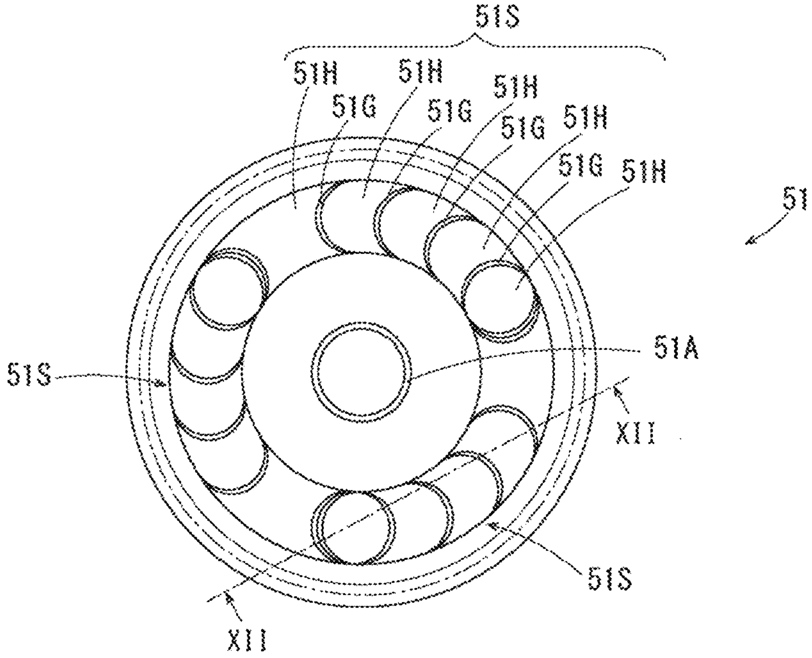
FIG. 11 is a plan view illustrating the rotating member according to the embodiment of the present disclosure.
Figure 12:
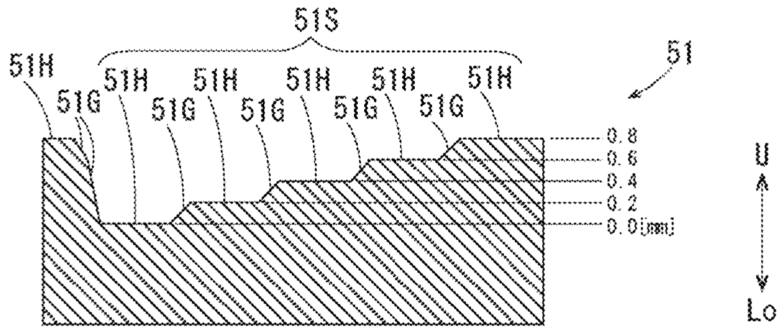
FIG. 12 is a sectional view illustrating a cross section taken along line XII-XII in FIG. 11.
Figure 13:
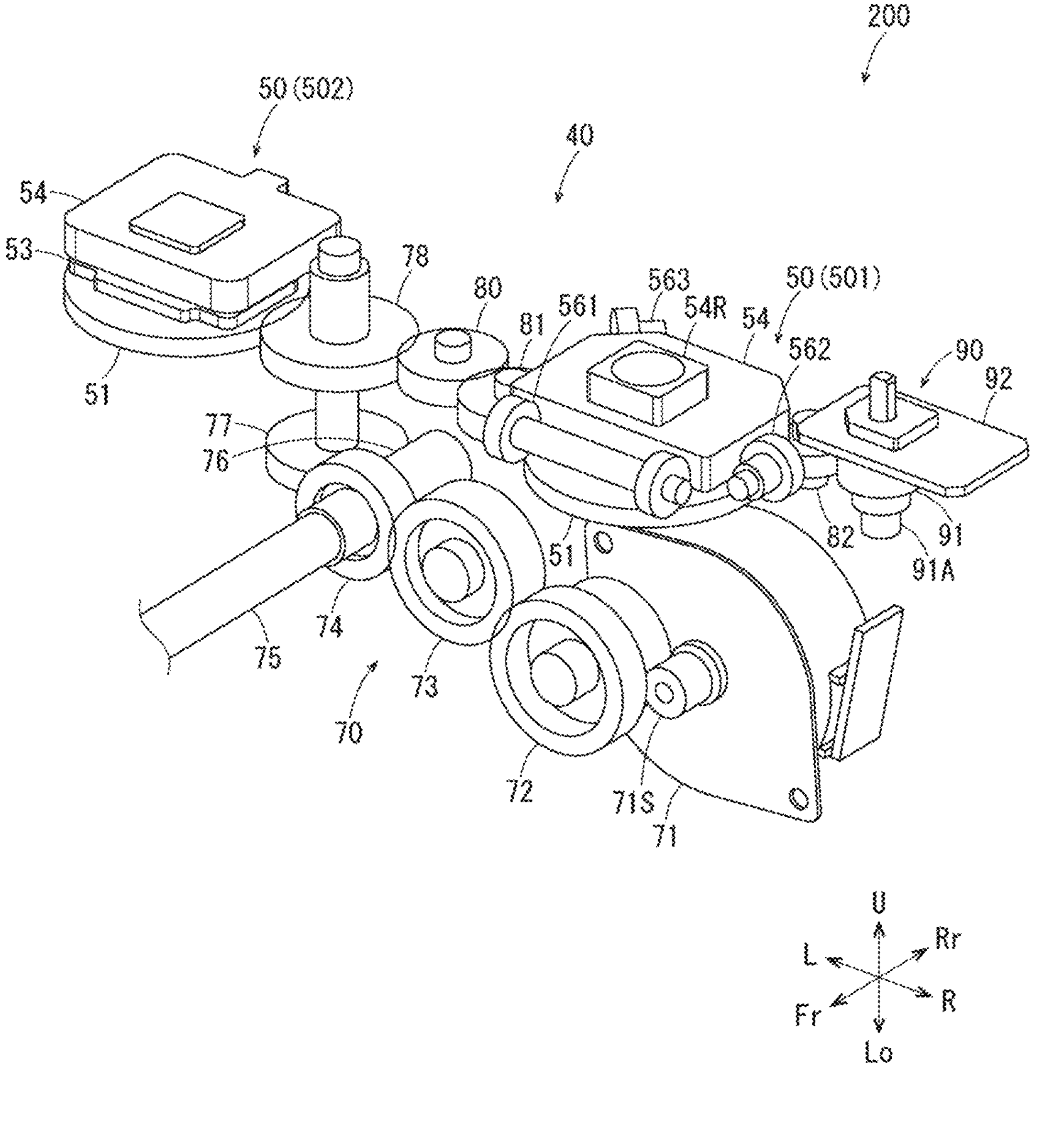
FIG. 13 is a perspective view illustrating a detection system according to the embodiment of the present disclosure.

FIG. 5 is a perspective view illustrating the adjustment device 40. FIG. 6 is a perspective view illustrating a gap adjustment device 50. FIG. 7 is a perspective view illustrating a rotating member 51, spherical bodies 52B, and a holder 53. FIG. 8 is a perspective view illustrating the rotating member 51 and the spherical bodies 52B. FIG. 9 is a perspective view illustrating the rotating member 51. FIG. 10 is a sectional view illustrating a cross section taken along line X-X in FIG. 6. FIG. 11 is a plan view illustrating the rotating member 51. FIG. 12 is a sectional view illustrating a cross section taken along line XII-XII in FIG. 11. FIG. 13 is a perspective view illustrating the detection system 200.

The head units 11 (see FIGS. 3 and 4) each include three inkjet heads 12, which are arranged in a staggered pattern, and a frame body 11F that supports the three inkjet heads 12. At a bottom part of the frame body 11F, a contact portion 11C is disposed one at each of two positions in a left-right direction, in each of front and rear end parts. The contact portion 11C is, for example, a pin that projects downward. Under the rear end part of the frame body 11F, the adjustment device 40 is disposed. Under the front end part of the frame body 11F, the adjustment device 60 is disposed. The adjustment devices 40 and 60 support the head unit 11 via the contact portions 11C. What follows is a description of the adjustment device 40 as an example.

The adjustment device 40 (see FIG. 5) has a case 41 that is in a rectangular parallelepiped shape of which a longitudinal direction is along the left-right direction. Inside the case 41, the gap adjustment device 50 (see FIG. 6) is housed. The gap adjustment device 50 is disposed one at each of two positions in the left-right direction. The gap adjustment device 50 on the right side and the gap adjustment device 50 on the left side are identical in basic configuration. (Hereinafter, the gap adjustment device 50 on the right side may sometimes be referred to as the gap adjustment device 501, and the gap adjustment device 50 on the left side may sometimes be referred to as the gap adjustment device 502.)

[Gap Adjustment Device]

The gap adjustment device 50 (see FIGS. 6 to 12) includes a first axis 51A, a first rotating member 51, an adjustment member 54, the spherical bodies 52B, and the holder 53.

[First Axis, First Rotating Member]

The first axis 51A extends in the upper-lower direction as its axial direction, and is supported by the case 41. The first rotating member 51 is, for example, a spur gear with 45 teeth. An upper surface of the first rotating member 51 (see FIGS. 9, 11, and 12) is an example of an intersection surface 51C that intersects the first axis 51A. On the intersection surface 51C, stepped portions 51S are disposed, each having a height that changes in a stepwise manner. The stepped portions 51S, which are of the same pattern, are disposed at a plurality of positions on the intersection surface 51C in a circumferential direction of the intersection surface 51C. In the present embodiment, the stepped portions 51S of the same pattern are disposed at three positions on the intersection surface 51C in the circumferential direction of the intersection surface 51C.

[Stepped Portion]

The stepped portions 51S each include five steps 51H arranged in the circumferential direction, and four inclined surfaces 51G each connecting adjacent ones of the steps 51H. The five steps 51H are arranged such that their heights increase in a stepwise manner in a counterclockwise direction. Let the height of a lowest step 51H be 0.0 [mm] (see FIG. 12), then, the subsequent steps 51H are each higher than an immediately preceding step by 0.2 [mm] in the counterclockwise direction. The three stepped portions 51S are equally spaced from each other in the circumferential direction. In other words, the intersection surface 51C is configured such that the same-patterned stepwise height change is repeated at 120[°] intervals.

[Adjustment Member]

The adjustment member 54 (see FIGS. 6 and 10) as a whole is formed in a shape of a rectangular parallelepiped block. The adjustment member 54 is disposed above the first rotating member 51. One surface 541 (e.g., a lower surface) of the adjustment member 54 faces the intersection surface 51C of the first rotating member 51, and another surface 542 (e.g., an upper surface) of the adjustment member 54 faces the bottom part of the frame body 11F. The adjustment member 54 is supported by the case 41 and the first axis 51A, and is slidable in a direction of the first axis 51A.

[Spherical Body]

Between the one surface 541 of the adjustment member 54 and the intersection surface 51C, the spherical bodies 52B (see FIGS. 7, 8, and 10) are disposed. The spherical bodies 52B are arranged one on each of a plurality of the stepped portions 51S. The three spherical bodies are arranged at 120[°] intervals. That is, the spherical bodies 52B respectively contact the steps 51H of the same height in the plurality of the stepped portions 51S. The spherical bodies 52B are held by the holder 53. The holder 53 restrains movement of the spherical bodies 52B relative to the holder 53. From upper and lower surfaces of the holder 53, the spherical bodies 52B partly project. The holder 53 is supported by the case 41 and the first axis 51A, and is slidable in the direction of the first axis 51A, but rotation of the holder 53 about the first axis 51A is restrained. With this configuration, movement of the spherical bodies 52B in the circumferential direction is restrained. Since the height of the steps 51H that contact the spherical bodies 52B changes as the first rotating member 51 rotates, the adjustment member 54 moves in the direction of the first axis 51A together with the spherical bodies 52B and the holder 53.

[Restraint Portion]

A top portion of the gap adjustment device 50 is covered with a lid 42. In the lid 42, an opening 42A (see FIG. 5) is disposed one above each of two adjustment members 54. At the opening 42A, the another surface 542 (the upper surface) of the adjustment member 54 is partly exposed. The adjustment member 54 of the gap adjustment device 501 is provided with a restraint portion 54R. The restraint portion 54R is disposed on the another surface 542 of the adjustment member 54, and projects upward from the opening 42A of the lid 42. The restraint portion 54R has a shape recessed in a funnel shape or a cylindrical shape. With the contact portion 11C of the head unit 11 received in the restraint portion 54R, the movement of the contact portion 11C in a direction intersecting the first axis 51A is restrained.

[Roller]

The adjustment member 54 of the gap adjustment device 501 is formed, as seen from above, in a substantially hexagonal shape by diagonally cutting a left rear corner and a right rear corner of a rectangle having four sides along the front-rear and left-right directions. Of the adjustment member 54, a front surface, a right surface, and a left-rear side surface are respectively in contact with rollers 561, 562, and 563, of which axial directions are horizontal. The rollers 561, 562, and 563 restrain lateral movement of the adjustment member 54, and also guide movement of the adjustment member 54 in the upper-lower direction.

[Driving Portion]

A driving portion 70 (see FIGS. 4 and 13) drives the gap adjustment devices 50. A driving force generated by a motor 71 is transmitted from a driving gear 71S disposed on a driving axis of the motor 71, sequentially via an idler gear 72, an idler gear 73, an idler gear 74, a worm 76, a worm wheel 77, and a driving gear 78, to the first rotating member 51 of the gap adjustment device 502. Further, from the driving gear 78, sequentially via an idler gear 80 and an idler gear 81, the driving force is transmitted to the first rotating member 51 of the gap adjustment device 501. Further, the driving force is transmitted from the idler gear 74, via a transmission axis 75, to the adjustment device 60.

[Control Portion]

In the control portion 2 (see FIG. 2), conversion information is stored that associates sheet thicknesses with rotation angles of the first rotating member 51. The control portion 2 obtains, from the conversion information, the rotation angle corresponding to the thickness of a sheet fed into the conveyance path 10, and drives the first rotating member 51 by means of the driving portion 70. Since the height of the steps 51H that contact the spherical bodies 52B changes as the first rotating member 51 rotates, the adjustment member 54 moves in the direction of the first axis 51A together with the spherical bodies 52B and the holder 53. Along with the movement of the adjustment member 54, the head unit 11 moves in the direction of the first axis 51A. In this manner, in accordance with the thickness of the sheet, the gap by which the head unit 11 is spaced from the conveyance path 10 is adjusted.

With the gap adjustment device 50 according to the present embodiment, positional adjustment (in this embodiment, gap adjustment) performed by the adjustment member 54 can be achieved by rotating the first rotating member 51, and this contributes to higher space efficiency compared to a configuration that slides a member having linearly formed steps. Further, the height of the head unit 11 can be adjusted in both upper and lower directions by rotating the first rotating member 51, and this helps prevent backlash impact. Thus, according to the present embodiment, it is possible to perform positional adjustment without degrading space efficiency and durability. Further, load on the first rotating member 51 and the adjustment member 54 is scattered over a plurality of positions, and this helps suppress stress concentration. Further, the load is scattered around the first axis 51A, and this helps suppress distortion of the first rotating member 51, adjustment errors, etc. due to unbalanced load.

[Detection System]

Next, a description will be given of the detection system 200 (see FIG. 13) according to the present embodiment. The detection system 200 includes the gap adjustment device 50 (an example of the detection target device) and a detection device 90.

[Detection Device]

The detection device 90 is, for example, a potentiometer. The detection device 90 includes a second axis 91A, a second rotating member 91, and a substrate 92. The second axis 91A extends in the upper-lower direction as its axial direction, and is supported by the substrate 92. The second rotating member 91 is, for example, a spur gear with 15 teeth. From the first rotating member 51 of the gap adjustment device 501, via an idler gear 82, the driving force is transmitted to the second rotating member 91. On the substrate 92, there is disposed a circuit that includes a variable resistor. The detection device 90 outputs a voltage corresponding to a rotation angle of the second rotating member 91.

Figure 14A:
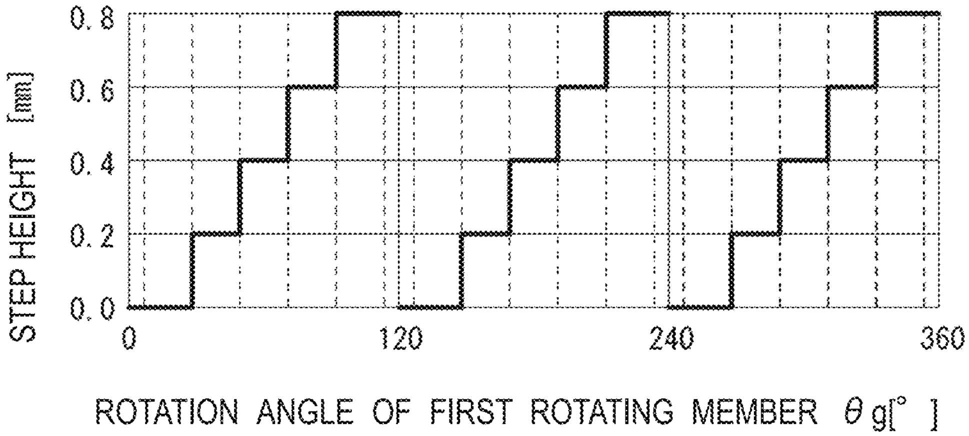
FIG. 14A and FIG. 14B are diagrams illustrating how the detection system operates while a first rotating member makes 1 rotation.
Figure 14B:
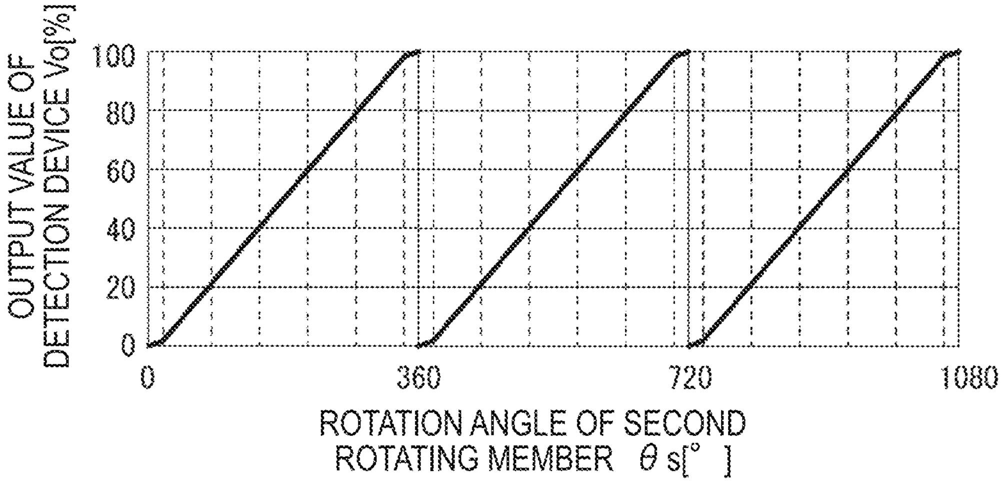

FIG. 14A and FIG. 14B are diagrams illustrating how the detection system 200 operates while the first rotating member 51 makes 1 rotation. Of these figures, FIG. 14A is a diagram illustrating a relationship between the rotation angle θg[°] of the first rotating member 51 and the height [mm] of the steps 51H that contact the spherical bodies 52B. A horizontal axis in FIG. 14A represents the rotation angle in a case where the first rotating member 51 is driven in a clockwise direction as seen from above. The gap adjustment device 50 repeats an operation corresponding to the rotation angle of the first rotating member 51 every time the first rotating member 51 makes a 1/N rotation (N=3). This operation is an operation in which the height of the steps 51H that contact the spherical bodies 52B increases step by step from lowermost steps 51H toward uppermost steps 51H of the stepped portions 51S.

FIG. 14B is a diagram illustrating a relationship between the rotation angle θs[°] of the second rotating member 91 and the output value Vo % of the detection device 90. With the idler gear 82 intervening between the first rotating member 51 and the second rotating member 91, the second rotating member 91 rotates in the same direction as the first rotating member 51. That is, a horizontal axis in FIG. 14B represents the rotation angle in a case where the second rotating member 91 is driven in the clockwise direction as seen from above. A vertical axis in FIG. 14B represents a ratio of the output value of the detection device 90 with respect to the maximum output value in percentage. Every time the first rotating member 51 makes a 1/N rotation, the second rotating member 91 makes 1 rotation. Every time the second rotating member 91 makes 1 rotation, the output value of the detection device 90 repeats monotonic increase from a minimum value to a maximum value in accordance with the rotation angle of the second rotating member 91. Note that the output value of the detection device 90 may be configured to monotonically decrease.

As illustrated in FIG. 14A and FIG. 14B, heights of the steps 51H that contact the spherical bodies 52B during a 1/N rotation of the first rotating member 51 and output values of the detection device 90 output during 1 rotation of the second rotating member 91 are associated with each other. With this configuration, from the output value of the detection device 90, the height of the steps 51H that contact the spherical bodies 52B is obtained. The control portion 2 judges whether or not the height of the steps 51H that contact the spherical bodies 52B corresponds to the thickness of a sheet, and if the height of the steps 51H is the height that corresponds to the thickness of the sheet, the control portion 2 executes an image forming job. If the height of the steps 51H is lower than the height corresponding the thickness of the sheet, the control portion 2 drives the first rotating member 51 to rotate clockwise by an amount corresponding to one step, and then makes a judgment about the height of the steps 51H again. On the other hand, if the height of the steps 51H is higher than the height corresponding to the thickness of the sheet, the control portion 2 drives the first rotating member 51 to rotate counterclockwise by the amount corresponding to one step, and then makes a judgment about the height of the steps 51H again.

In the present embodiment, the operation amount of the first rotating member 51 for every 1/N rotation is associated with the output value of the detection device 90 for every 1 rotation, and thus the resolution of the detection device 90 is maximized. Consequently, the operation amount of the detection target device can be detected with high accuracy.

Figure 15A:
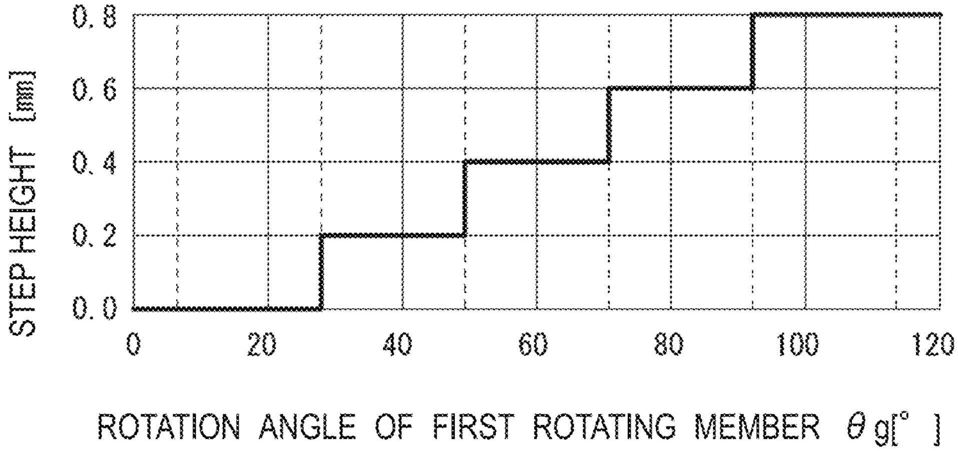
FIG. 15A and FIG. 15B are diagrams illustrating how the detection system operates while a first rotating member makes a 1/N rotation (N=3).
Figure 15B:
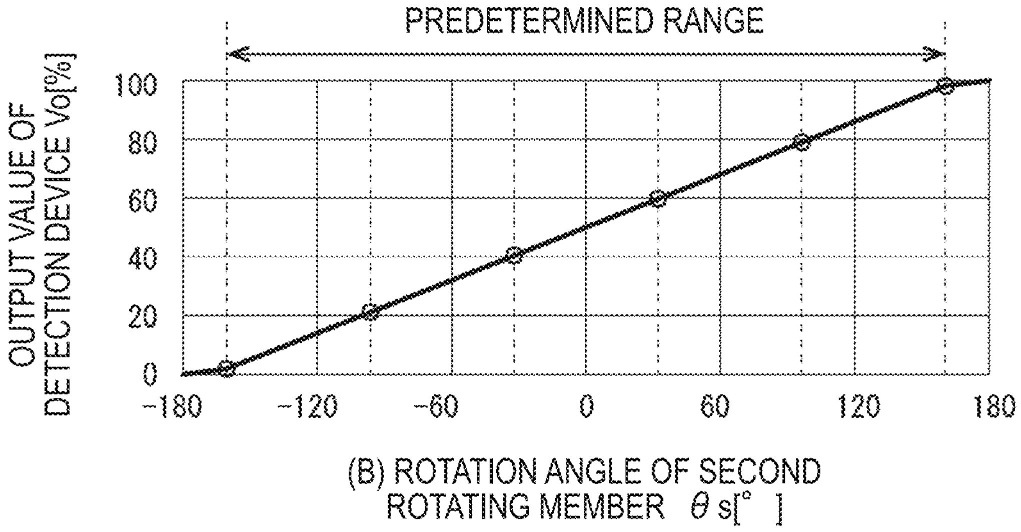

FIG. 15A and FIG. 15B are diagrams illustrating how the detection system 200 operates while the first rotating member 51 makes a 1/N rotation (N=3). Specifically, FIG. 15A is a diagram illustrating a section between two points where θg=0[°] and θg=120[°] in FIG. 14A in a manner enlarged in the direction of the horizontal axis, and FIG. 15B is a diagram illustrating a section between two points where θs=0[°] and θs=360[°] in FIG. 14B in a manner enlarged in the direction of the horizontal axis. Note that, in FIG. 15B, the scale on the horizontal axis is replaced with one from −180 [°] to 180 [°].

As is illustrated in FIG. 15B, the output value of the detection device 90 (a potentiometer) has a smaller inclination and thus has lower resolution in sections near the minimum and maximum values than in the other sections. Further, as illustrated in FIG. 14B, the output value discontinuously varies from the maximum value to the minimum value at separation timings between adjacent rotations of the second rotating member 91, and this may invite erroneous recognition of the height of the steps 51H.

In contrast, in the present embodiment, within a whole range of the output value of the detection device 90 from the minimum value to the maximum value, a range excluding the sections where the output value varies discontinuously, in other words, a predetermined range (see FIG. 15B) where detection accuracy is guaranteed, is assigned to a region corresponding to a 1/N rotation of the first rotating member 51, and thus, it is possible to prevent erroneous recognition of the operation amount of the first rotating member 51. Thus, according to the present embodiment, it is possible to detect the operation amount of the detection target device with high accuracy.

According to the present embodiment described above, the detection system 200 includes: a detection target device (e.g., the gap adjustment device 50) that includes the first rotating member 51 rotatable about the first axis 51A and that repeats an operation corresponding to the rotation angle of the first rotating member 51 every time the first rotating member 51 makes a 1/N rotation, N being an integer of 2 or greater; and the detection device 90 that includes the second rotating member 91 rotatable about the second axis 91A due to a driving force transmitted from the first rotating member 51 and of which the output value repeats monotonic increase or monotonic decrease in accordance with the rotation angle of the second rotating member 91 every time the second rotating member 91 makes 1 rotation. The second rotating member 91 makes 1 rotation every time the first rotating member 51 makes a 1/N rotation. With this configuration, the operation amount of the detection target device can be detected with high accuracy.

Further, according the present embodiment, in the detection system 200, the first rotating member 51 includes the intersection surface 51C that intersects the first axis 51A, the detection target device (the gap adjustment device 50) includes the stepped portions 51S that are disposed on the intersection surface 51C and each of which has a height that changes in a stepwise manner in the circumferential direction, the adjustment member 54 that faces the intersection surface 51C and that is movable in the direction of the first axis 51A, and the spherical bodies 52B that are sandwiched between the adjustment member 54 and the intersection surface 51C and of which movement in the circumferential direction is restrained. The stepped portions 51S of the same pattern are arranged at the N positions on the intersection surface 51C in the circumferential direction. The spherical bodies 52B are disposed one on each of the stepped portions 51S arranged at the N positions. The spherical bodies 52B contact steps 51H of the same height in the stepped portions 51S arranged at the N positions. With this configuration, the height of the steps 51H in contact with the spherical bodies 52B can be detected with high accuracy.

Further, in the detection system 200 according to the present embodiment, the detection device 90 is a potentiometer. With this configuration, the detection system 200 can be built inexpensively.

Further, in the detection system 200 according to the present embodiment, the first rotating member 51 and the second rotating member 91 are each a gear. With this configuration, it is possible to eliminate errors in the operation amount due to slip of the first rotating member 51 and the second rotating member 91.

Further, according to the present embodiment, the inkjet recording apparatus 1 includes the head unit 11 that includes one or more inkjet heads 12 and that contacts the adjustment member 54, the detection system 200, and the control portion 2 that controls the detection target device in accordance with the operation amount of the detection target device detected by the detection system 200. With this configuration, highly accurate gap adjustment can be performed with respect to the head unit 11.

The above-described embodiment may be modified as follows.

In the above-described embodiment, an example has been dealt with where the first rotating member 51 is a spur gear, but, as long as the first rotating member 51 is configured to be driven to rotate about the first axis 51A, the first rotating member 51 itself does not necessarily need to be a gear. For example, a gear may be attached to a lower surface of a disc-shaped first rotating member 51 (unillustrated). This also applies to the second rotating member 91.

Or, the driving force may be transmitted from the first rotating member 51 to the second rotating member 91 by using means other than gears. For example, the first rotating member 51 and the second rotating member 91 may each be constituted of a magnetic gear.

Further, although the above embodiment has dealt with a case where the first rotating member 51 has 45 teeth and the second rotating member 91 has 15 teeth, these numbers of teeth are merely examples, and, as long as the ratio of the number of teeth between the first rotating member 51 and the second rotating member 91 is N:1, the numbers of teeth may be other than the above numbers.

Figure 16:
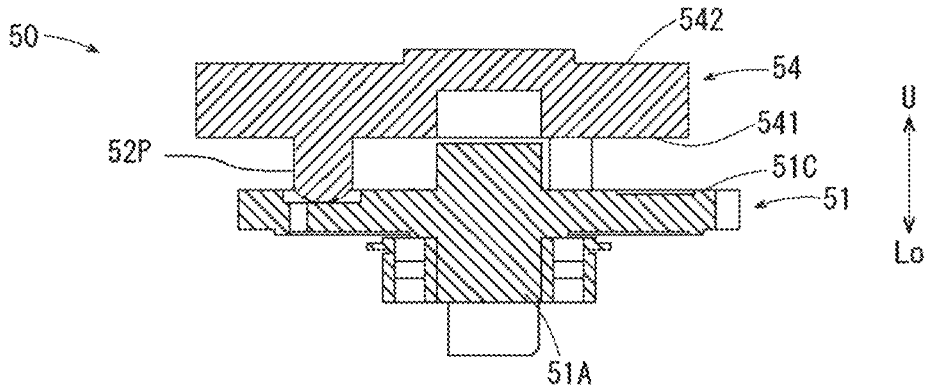
FIG. 16 is a sectional view where projecting portions are provided instead of spherical bodies.

Instead of the spherical bodies 52B of the above-described embodiment, there may be provided projecting portions 52P (see FIG. 16) that project from the one surface 541 of the gap adjustment member 54 and that contact the intersection surface 51C. FIG. 16 is a sectional view where the projecting portions 52P are provided instead of the spherical bodies 52B. In this case, the holder 53 is unnecessary. The projecting portions 52P are arranged one with respect to each of the stepped portions 51S, and the projecting portions 52P contact the steps 51H of the same height in the plurality of the stepped portions 51S. With this configuration, as well, the height of the steps 51H that contact the projecting portions 52P changes as the rotating member 51 rotates, so that the gap adjustment member 54 moves in the direction of the axis 51A.

The above-described embodiment has dealt with an example where the detection device 90 is a potentiometer, but the detection device 90 may instead be an absolute rotary encoder, for example.

The above-described embodiment has dealt with an example where the detection system 200 is applied to gap adjustment for the head unit 11, but the detection system 200 is applicable to various usages. For example, the detection system 200 may be used for positioning of various movable components such as a shading board of an image reading apparatus, a separation claw for separating a sheet from an electronic photo fixing roller, etc.

According to the present disclosure, it is possible to detect the operation amount of a detection target device with high accuracy.

What is claimed is:

1. A detection system, comprising:

a detection target device that includes a first rotating member rotatable about a first axis and that repeats an operation corresponding to a rotation angle of the first rotating member every time the first rotating member makes a 1/N rotation, N being an integer of 2 or greater; and a detection device that includes a second rotating member rotatable about a second axis due to a driving force transmitted from the first rotating member and of which an output value repeats monotonic increase or monotonic decrease in accordance with a rotation angle of the second rotating member every time the second rotating member makes 1 rotation, wherein every time the first rotating member makes a 1/N rotation, the second rotating member makes 1 rotation.

2. The detection system according to claim 1, wherein the first rotating member includes an intersection surface that intersects the first axis, and the detection target device includes stepped portions that are disposed on the intersection surface and each of which has a height that changes in a stepwise manner in a circumferential direction, an adjustment member that faces the intersection surface and that is movable in a direction of the first axis, and spherical bodies that are sandwiched between the adjustment member and the intersection surface and of which movement in the circumferential direction is restrained, or projecting portions that project from the adjustment member and that contact the intersection surface, the stepped portions of a same pattern are arranged at N positions on the intersection surface in the circumferential direction, at each of the stepped portions arranged at the N positions, one of the spherical bodies or one of the projecting portions is disposed, and the spherical bodies or the projecting portions contact steps of a same height in the stepped portions arranged at the N positions.

3. The detection system according to claim 1, wherein the detection device is a potentiometer.

4. The detection system according to claim 1, wherein the first rotating member and the second rotating member are each a gear.

5. An inkjet recording apparatus, comprising:

a head unit that includes one or more inkjet heads and that contacts the adjustment member, the detection system according to claim 2; and a control portion that controls the detection target device in accordance with an operation amount of the detection target device detected by the detection system.

* * * * *